United States Patent
Wang et al.

(10) Patent No.: US 10,493,788 B2
(45) Date of Patent: Dec. 3, 2019

(54) OPTICAL SECURITY DEVICE WITH FULL PARALLAX DIFFRACTION OPTICAL VARIABLE IMAGE

(71) Applicants: ZHONGCHAO SPECIAL SECURITY TECHNOLOGY CO., LTD, Beijing (CN); CHINA BANKNOTE PRINTING AND MINTING CORP., Beijing (CN)

(72) Inventors: Xiaoli Wang, Beijing (CN); Xinyi Li, Beijing (CN); Chengyao Li, Beijing (CN); Jun Zhu, Beijing (CN)

(73) Assignee: ZHONGCHAO SPECIAL SECURITY TECHNOLOGY CO., LTD, Beijing (CN)

( * ) Notice: Subject to any disclaimer, the term of this patent is extended or adjusted under 35 U.S.C. 154(b) by 199 days.

(21) Appl. No.: 15/329,127

(22) PCT Filed: Jul. 29, 2015

(86) PCT No.: PCT/CN2015/085420
§ 371 (c)(1),
(2) Date: Jan. 25, 2017

(87) PCT Pub. No.: WO2016/015645
PCT Pub. Date: Feb. 4, 2016

(65) Prior Publication Data
US 2018/0215188 A1    Aug. 2, 2018

(30) Foreign Application Priority Data

Aug. 1, 2014 (CN) .......................... 2014 1 0377206

(51) Int. Cl.
*G02B 5/18* (2006.01)
*B42D 25/328* (2014.01)
(Continued)

(52) U.S. Cl.
CPC ........... *B42D 25/328* (2014.10); *B42D 25/29* (2014.10); *B42D 25/30* (2014.10); *B42D 25/324* (2014.10);
(Continued)

(58) Field of Classification Search
CPC ........ B42D 25/21; B42D 25/29; B42D 25/30; B42D 25/40; B42D 25/45; B42D 25/324;
(Continued)

(56) References Cited

U.S. PATENT DOCUMENTS

2002/0163678 A1* 11/2002 Haines ................. G03H 1/0011
359/2
2006/0181077 A1   8/2006 Kaule et al.
(Continued)

FOREIGN PATENT DOCUMENTS

CN      101699323      4/2010
CN      102903298      1/2013
(Continued)

OTHER PUBLICATIONS

Notice of Reason for Refusal dated Jan. 30.
Notice of Reason for Refusal dated Sep. 6, 2018.

*Primary Examiner* — Mustak Choudhury
(74) *Attorney, Agent, or Firm* — Porzio Bromberg & Newman P.C.

(57) ABSTRACT

The present invention discloses an optical security device with full parallax diffraction optical variable image, the optical security device comprises: a base layer; and an optical assembly at least partially covering a surface of the base layer; wherein the optical assembly has a micro relief structure, so that when a beam of white light illuminates on the optical assembly, the optical assembly presents a full parallax image under the action of the micro relief structure. The present invention obtains the micro relief structure
(Continued)

through combining the phase plate, and achieves the reconstruction of the full parallax diffraction optical variable image under the condition of white light illumination.

18 Claims, 2 Drawing Sheets

(51) Int. Cl.
  *B42D 25/29*   (2014.01)
  *B42D 25/30*   (2014.01)
  *B42D 25/324*  (2014.01)
  *B42D 25/373*  (2014.01)
  *B42D 25/45*   (2014.01)
(52) U.S. Cl.
  CPC ......... *B42D 25/373* (2014.10); *G02B 5/1809* (2013.01); *G02B 5/1842* (2013.01); *B42D 25/45* (2014.10)
(58) Field of Classification Search
  CPC .. B42D 25/328; B42D 25/342; B42D 25/485; B42D 25/1809; B42D 15/00; G02B 5/373; G02B 5/1842; G02B 27/22; G02B 27/2214; G02B 3/0037; B41M 3/14; G09F 19/14
  USPC ... 359/9–12, 20–25, 35, 457, 462, 567, 619; 358/3.28
  See application file for complete search history.

(56) References Cited

U.S. PATENT DOCUMENTS

| 2008/0037124 | A1* | 2/2008 | Ohmi | G02B 1/118 359/558 |
| 2009/0316238 | A1* | 12/2009 | Drinkwater | B44F 1/10 359/2 |
| 2012/0139229 | A1 | 6/2012 | Matsubara et al. | |
| 2014/0177008 | A1* | 6/2014 | Raymond | B42D 25/324 358/3.28 |

FOREIGN PATENT DOCUMENTS

| JP | 6281804 A | 3/1993 |
| JP | 2011126029 A | 12/2009 |

\* cited by examiner

OPTICAL SECURITY DEVICE WITH FULL PARALLAX DIFFRACTION OPTICAL VARIABLE IMAGE

FIELD OF THE INVENTION

The present invention relates to an optical anti-counterfeiting technology, in particular, to an optical security device with full parallax diffraction optical variable image.

BACKGROUND OF THE INVENTION

In order to prevent counterfeiting, an optical security element with diffraction optical variable image (for example, a hologram, a dynamic diffraction picture, and the like) is widely used in various prints with high security and high value-added, such as bank notes, identification cards, and product packages, and it achieves a good effect. For example, euro bank notes in large denomination adopt is hot stamping patches with diffraction optical variable image, while bank notes in small denomination adopt hot stamping stripes with diffraction optical variable image. The RMB, except the denomination of one yuan, adopts window threads with diffraction optical variable image. Visa, MasterCard and UnionPay cards adopt the hot stamping patches with diffraction optical variable image; and important documents in China such as ID cards, driving licenses, and passports also adopt the anti-counterfeiting technology of diffraction optical variable image. Currently, most of the bank notes, credit cards, passports and the like in the world also adopt the anti-counterfeiting technology of the diffraction optical variable image.

The diffraction optical variable image, under the condition of white light illumination, can reconstruct three-dimensional effect, dynamic change, color change images and the like, and under the condition of laser illumination or by means of other supplementary measures (a decoding plate, a magnifying lens, and the like) can reconstruct a hidden pattern, an encoded pattern, and the like. The former is an anti-counterfeiting feature for public while the latter is anti-counterfeiting feature for professionals and experts. The optical structure of these anti-counterfeiting products is diffraction grating of a surface relief type, and is generally manufactured by transferring the diffraction structure on a base layer through molding process.

The diffraction optical variable image in the prior art can only have parallax in one direction (generally defined as a horizontal direction), and have no parallax in a perpendicular direction (defined as a vertical direction). That is to say, three-dimensional and dynamic effects can only be achieved in the horizontal direction rather than in the vertical direction. This is decided by the optical grating structure of the existing diffraction optical variable image. Due to its strong chromatic dispersion, a clear image can be obtained under the condition of white light illumination, only that parallax in the vertical direction is sacrificed. In addition, the existing diffraction optical variable image reconstructs an image in a direction of ±1 level light, but reconstructs no image in the reflected light/transmission light (0 level) direction.

SUMMARY OF THE INVENTION

The purpose of the present invention is to provide an optical security device with full parallax diffraction optical variable image, for solving the problem of achieving a full parallax diffraction optical variable image under the condition of white light illumination.

In order to achieve the aforementioned purpose, the present invention provides an optical security device with full parallax diffraction optical variable image, wherein the optical security device comprises: a base layer; an optical assembly at least partly covering one of surfaces of the base layer, and comprising a micro relief structure, so that the optical assembly presents a full parallax image under action of the micro relief structure when a beam of white light illuminates on the optical assembly.

By means of the aforementioned technical solution, the present invention, by means of combining a phase plate, obtains a micro relief structure, and achieves reconstruction of the full parallax diffraction optical variable image under the condition of white light illumination.

Other characteristics and advantages of the present invention will be further detailed in the embodiments hereunder.

DESCRIPTION OF THE DRAWINGS

The accompanying drawings are provided here to facilitate further understanding on the present invention, and constitute a part of this document. They are used in conjunction with the following embodiments to explain the present invention, but shall not be comprehended as constituting any limitation to the present invention. The accompanying drawings are provided here to facilitate further understanding on the present invention, and constitute a part of this document. Among the figures.

DESCRIPTION OF THE SYMBOLS 101 base layer 102 optical assembly
1021 micro relief structure 1022 micro relief unit
103 duplicate layer 104 coating layer

DETAILED DESCRIPTION OF THE EMBODIMENTS

Hereunder some embodiments of the present invention will be detailed. It should be understood that the embodiments described herein should only be used for explaining and interpreting the present invention but not to limit the present invention.

Figure 1:
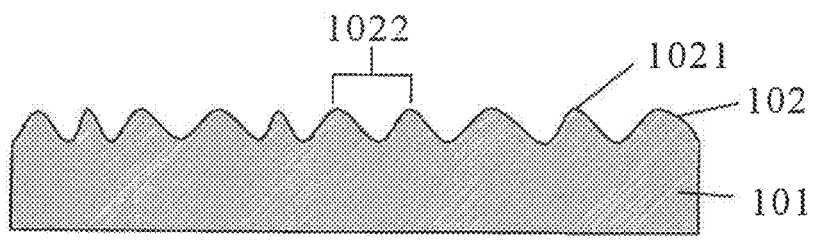
FIG. 1 is a schematic diagram of an optical security device with full parallax diffraction optical variable image according to the present invention.

FIG. 1 is a schematic diagram of an optical security device with full parallax diffraction optical variable image according to the present invention. As shown in FIG. 1, the optical security device comprises a base layer 101 and an optical assembly 102 at least partially covering a surface of the base layer 101. As shown in FIG. 1, the optical assembly 102 has a micro relief structure 1021, so that when a beam of white light illuminates on the optical assembly 102, the optical assembly 102 presents a full parallax image under the action of the micro relief structure.

The "micro relief structure" refers to an uneven micro structure formed on a two-dimensional surface according to requirements. The explanation for the "parallax image" is as follows: due to a distance of about 65 mm between two eyes of a person, object images seen by the two eyes are slightly different, and such difference is parallax. The parallax image can be interpreted as a series of images of an object having a certain parallax relation presented at different observing angles. The parallax relation enables the parallax image to present dynamic and three-dimensional effects. The "full parallax image" not only comprises parallax in a horizontal direction, but also comprises parallax in other directions. The "full parallax diffraction optical variable image" represents a diffraction optical variable image reconstructed by white light having parallax in a horizontal direction and parallax in other directions, which is different from the diffraction optical variable image reconstructed by white light only having parallax in the horizontal direction in the prior art.

A sectional shape of the micro relief unit 1022 of the micro relief structure can be one of sinusoid shape, zigzag shape, and rectangle, or can be a combination of any two or three of the sinusoid shape, the zigzag shape, and the rectangle. Those skilled in the art should understand that, other shapes are also allowed apart from these shapes. The "micro relief unit" refers to an area formed by curves connecting adjacent minimum points or adjacent maximum points in the micro relief structure, these curves divide the micro relief structure into a plurality of areas, each area is a micro relief unit, and all micro relief units form the micro relief structure. That is to say, the micro relief structure consists of a plurality of micro relief units.

The phase of the micro relief structure shown in FIG. 1 is obtained through combining the phase plate, and the specific embodiment is described in combination of FIG. 2 as follows.

Figure 2:
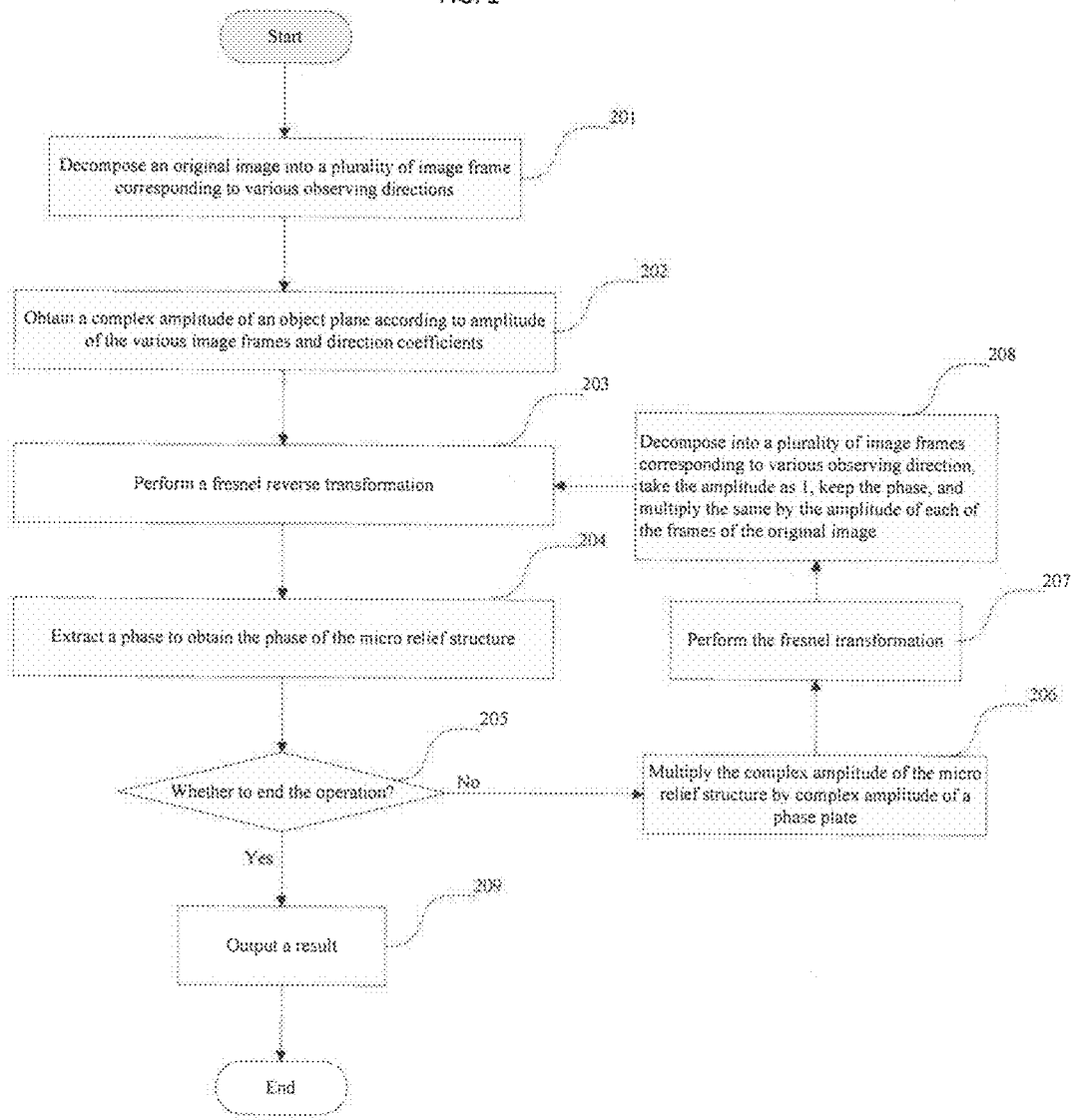
FIG. 2 is a flow chart of a method for calculating a phase of a micro relief structure according to the present invention.

FIG. 2 is a flow chart of a method for calculating a phase of a micro relief structure according to the present invention. As shown in FIG. 2, the phase of the micro relief structure can be obtained through calculation using the following method:

Step 201, decompose an original image to be presented into a plurality of image frames corresponding to various observing directions.

The original image can be designed by means of any measure according to the full parallax dynamic and/or three-dimensional effects to be achieved. A camera or a video camera can be used to take images of an actual object at various angles, 3DS MAX, CAD, PhotoShop, CorelDRAW and the like can be used for designing, and images can be output according to corresponding visual angles.

Assuming there are m×n image frames after decomposing, where m and n are both positive integers, the amplitude distribution of the image frames is $O_{p,q}(x_0,y_0)$, where p=1, 2, ..., m, q=1, 2, ..., n, and $(x_0,y_0)$ represents a point on a corresponding image frame, and the propagation vector is $$k_{p,q} = \frac{2\pi}{\lambda} e_{p,q},$$

where $e_{p,q}$ is a unit vector of the corresponding image frame in the observing direction, and λ is a wavelength of the light of the corresponding image frame in the observing direction. In m×n image frames, each image frame is M×N pixels, where M and N are both positive integers.

Step 202, obtain a complex amplitude of an object plane according to amplitude of the various image frames and direction coefficients related to the various image frames. It is shown as follows in details: respectively multiply the amplitude of each image frame by the direction coefficient $\exp(jk_{p,q}\cdot r_{p,q}(x_0,y_0))$ of each image frame in a one-by-one correspondence, and sum the obtained results, to obtain the complex amplitude of the object plane, where $r_{p,q}(x_0,y_0)$ is a position vector.

The explanation is illustrated as follows:

Assume the complex amplitude of a certain image frame is:

$$o_{p,q}(x_0,y_0) = O_{p,q}(x_0,y_0)\exp(jk_{p,q}\cdot r_0(x_0,y_0))$$

where $O_{p,q}(x_0,y_0)$ is the amplitude of a certain image frame, and $r_0(x_0,y_0)$ is the position vector of the certain image frame at $(x_0,y_0)$;

The complex amplitude of the object plane is:

$$o(x_0, y_0) = \sum_{p=1}^{m} \sum_{q=1}^{n} O_{p,q}(x_0, y_0)\exp(jk_{p,q}\cdot r_0(x_0, y_0)).$$

Step 203, perform a fresnel reverse transformation on the complex amplitude of the object plane, and obtain the complex amplitude of the object light at the surface of the optical assembly 102. Since the distance between the object plane and the optical assembly 102 is small, in order to meet the condition of the fresnel transformation, by taking a pixel as a unit to perform the fresnel transformation respectively, as such M×N times of fresnel transformations are required.

Step 204, extract a phase of the complex amplitude of the object light at the surface of the optical assembly 102 obtained after the fresnel reverse transformation, take the amplitude value of the complex amplitude as 1 and keep the phase, to obtain the phase of the micro relief structure ψ(x,y).

Step 205, determine whether to end the operation, if so, execute step 209, otherwise, execute step 206. There are two methods to determine the condition that the operation ends. The first one is further calculating the complex amplitude of the of the micro relief structure reconstruction with the phase to be ψ(x,y), and comparing the same with $o(x_0,y_0)$ in step 202; and when an error is less than a preset value (for example, 10%), the operation ends. The method for calculating the error is a technique well known to those skilled in the art, and is omitted herein without giving unnecessary details. The second one is setting the number of cycles. Generally, 5-10 times of cycle operations can enable the result to reach an ideal effect. Therefore, the standard for determining whether to end the operation can be whether 5-10 times of cycle operations are executed. For example, it can be set as 6 times.

Step 206, multiply the complex amplitude exp(jψ(x,y)) of the micro relief structure by a predesigned complex amplitude of a phase plate.

Step 207, perform the fresnel transformation on the multiplying result in step 206.

Step 208, decompose the result obtained after the fresnel transformation performed in step 207 into a plurality of image frames corresponding to various observing directions, then take the amplitude of the complex amplitude in each image frame in the plurality of image frames as 1 and keep the phase, then multiply the same by the amplitude of each of the frames of the original image to obtain a new complex amplitude of the object plane, and return to step 203 for cycle operations.

Step 209, output a result.

It should be noted that, those skilled in the art should understand that, in the method shown in FIG. 2, the fresnel transformation can be executed at step 203, and the fresnel reverse transformation can be executed at step 207. Those skilled in the art should understand that, in the case when only executing 1 cycle, the phase of the micro relief structure can also be obtained, but the effect may not be good. If only 1 cycle is executed herein, execute step 201 to step 208, and then execute step 203 to step 205, and step 209.

The function of the phase plate is to reduce chromatic dispersion, and increase the sharpness of the reconstruction image. The method for designing the phase of the phase plate is as follows: divide the phase plate into a plurality of pixels; and the size and number of the pixels are consistent with those of the pixels of each image frame of the aforementioned original image. That is, the phase plate is divided into M×N pixels. Then, redivide each pixel of the phase plate into m×n sub-pixels having the same number of the plurality of image frames decomposed from the original image. That is, each pixel is redivided into sub-pixels. Endow each sub-pixel with a phase value associated with a direction coefficient of the corresponding image frame, to obtain the phase of the phase plate.

The phase value of the phase plate can be obtained through multiple methods. Two examples are used to illustrate the method for obtaining the phase value of the phase plate:

The first method: it is obtained through multiplying an absolute value of a propagation vector $k_{p,q}$ of the plurality of image frames by a first constant quantity $C_1$ and then adding a second constant quantity $C_2$. The plurality of image frames are obtained through decomposing the original image to be presented in step 201. This is the simplest phase plate, and the optical assembly 102 obtained through calculation by the phase plate obtained by means of the method has a rainbow effect. If it is desired to obtain the phase plate through this method, the following limitations are made on the original image: the number of the pixels overlapped among various image frames (pixels with intensity of 0 are not included) should be as small as possible, and the overlapping proportion should be less than 20%, preferably less than 10%, otherwise, the sharpness of the online image would be severely influenced.

The second method: the phase distribution of the phase plate equals to the quadric surface adding the constant quantity $C_3$. In this case, there is almost no limitation on the original image. The optical assembly 102 obtained through calculation by the phase plate obtained by means of the method has a decoloration effect.

The constant quantity $C_1$ in the above two methods decides an observing scope of the full parallax image and $C_2$ and $C_3$ decide a front observing direction. When the constants quantities $C_2$ and $C_3$ are 0, the observing direction is the reflected light direction of the security device.

The output result, i.e., the phase $\psi(x,y)$ of the micro relief structure, is a phase function of the micro relief structure constituting the optical assembly 102, and has a linear relation with a surface type function $h(x,y)$ of the micro relief structure. Therefore, using $\psi(x,y)$ to control platemaking device can manufacture an origination of the optical security device of the present application. Then, it is fabricated into a product through processes such as electroforming, embossing/UV duplicating, coating, slitting, etc.

In addition, each micro relief unit of the micro relief structure shown in FIG. 1 can be 0.3 μm-10 μm in at least one lateral direction, and preferably, it can be is be 0.8 μm-6 μm. The recited at least one lateral direction is at least one direction in a plane where the optical security device is located or a plane parallel thereto, and the sizes of other lateral directions are not limited. The duty ratio of the micro relief structure (the ratio of the protrusion part and the sum of the protrusion part and the recess part) can be 0.2-0.8, and preferably it can be 0.35-0.65. The depth of the micro relief structure (also referred to as a longitudinal size) can be 0.02-μm-3 μm, and preferably it can be 0.07 μm-1 μm. Preferably, the depth of the micro relief structure can meet the following conditions: when a beam of the natural light (the white light) is incident on the micro relief structure, the light of a wavelength is constructively interfered in the direction of the transmission light and/or reflected light, so that the optical security device presents a first color in the direction of the transmission light and/or reflected light, while presenting a second color in a diffraction light direction. If no selective absorption material is contained in the materials constituting the optical security device, the above described first and second colors are complementary colors.

The "depth of the micro relief structure" refers to the height difference between the adjacent maximum value and minimum value of the micro relief structure.

Figure 3:
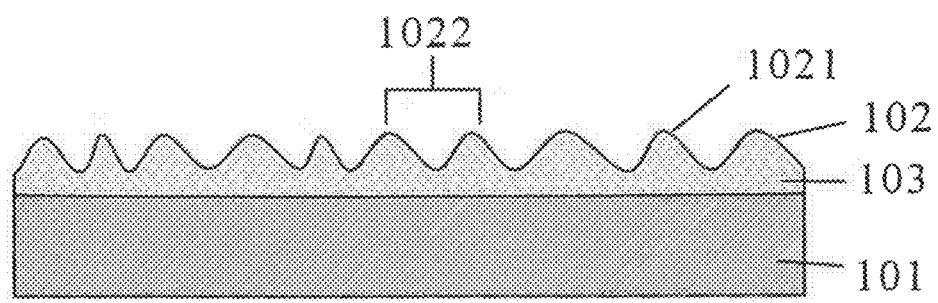
FIG. 3 is a schematic diagram of another optical security device with full parallax diffraction optical variable image according to the present invention.

FIG. 3 is a schematic diagram of another optical security device with full parallax diffraction optical variable image according to the present invention. As shown in FIG. 3, the optical security device can also comprise a duplicate layer 103, located between the base layer 101 and the optical assembly 102, a first surface of the duplicate layer 103 is jointed with the base layer 101, and a micro relief structure of the optical assembly 102 is formed on a second surface of the duplicate layer 103. Adding the duplicate layer 103 herein can enable the duplication of the micro relief structure to be easier, and the groove profile formed during the manufacturing process to be more accurate.

Figure 4:
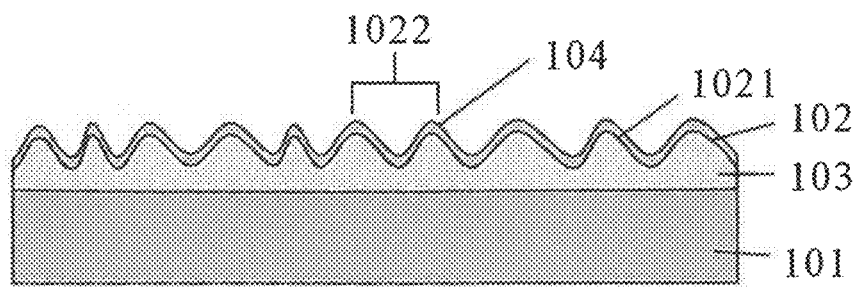
FIG. 4 is a schematic diagram of yet another optical security device with full parallax diffraction optical variable image according to the present invention.

FIG. 4 is a schematic diagram of another optical security device with full parallax diffraction optical variable image according to the present invention. As is shown in FIG. 4, the optical security device further comprises a coating layer 104, and the coating layer 104 is located on the optical assembly 102, and can cover the optical assembly 102 in same shape, i.e., using the shape of the micro relief structure to covers the optical assembly 102 in same shape. Certainly, the present invention is not limited thereto. The layer 104 can also cover the optical assembly 102 in any shape. The coating layer 104 can be a single-layer structure, or a multi-layer structure. The coating layer 104 can be patterned; if it is a multi-layer structure, one layer, several layers, or all layers thereof can be patterned.

The materials and structures of the coating layer 104 can be different. Using different materials and structures can form optical security device with full parallax diffraction optical variable image that have different effects. For example, under the condition that the coating layer 104 is a single layer of high refractive index dielectric (ZnS, $TiO_2$ and the like), a transparent optical security device can be formed; under the condition that the coating layer 104 is a single metal layer (Al, Cu and the like), a reflective optical security device can be formed; and under the condition that the coating layer 104 is a three-layer optical variable structure including a metal reflective layer, a dielectric layer, and an absorption layer, the optical security device can have a color shift effect. Under this condition, different thicknesses of the coating layer 104 would also present different color effects.

In addition, the optical security device according to the present invention can also comprise a protective layer and a release layer (not shown). Under the condition with the coating layer 104, the protective layer can be located on the coating layer 104; and under the condition without the coating layer 104, the protective layer can be located on the duplicate layer 103. Adding the protective layer can improve the tolerance of the security device. The release layer is located between the base layer 101 and the duplicate layer 103. The purpose of adding the release layer is to form a hot stamping product. Certainly, the present invention is not limited thereto. The protective layer can further be added between the release layer and the duplicate layer 103. A fluorescent substance can further be added in any layer so that the security device has a fluorescent characteristic or a fluorescent pattern. A magnetic dielectric layer can further be added in any two layers of dielectrics, to achieve a magnetic machine readable property.

The above exemplarily describes some preferable implementing solutions of the present invention. Moreover, those skilled in the art can understand that, without departing from the concept and spirit of the present invention, various equivalent transformations or modifications can be made thereto. Moreover, the obtained technical solutions should also belong to the scope of protection of the present invention.

The design of the full parallax diffraction optical variable image can rearrange the various image frames in a natural parallax order according to a set rule, which can not only can obtain an unexpected visual effect, but also improving the anti-counterfeiting performance of the security device. For example, the horizontal parallax can be exchanged with the vertical parallax image, so as to obtain a full parallax dynamic and/or three-dimensional image that has an orthogonally dynamic effect.

It should be explained that the micro relief structure provided by the present invention can be used in combination with the micro relief structures of other forms in the prior art (for example, a hologram, a dynamic diffraction graph and the like).

While some preferred embodiments of the present invention are described above, the present invention is not limited to the details in those embodiments, those skilled in the art can make modifications and variations to the technical scheme of the present invention, without departing from the spirit of the present invention, however, all these modifications and variations shall be deemed as falling into the protected scope of the present invention.

In addition, it should be appreciated that the technical features described in the above embodiments can be combined in any appropriate manner, provided that there is no conflict among the technical features in the combination. To avoid unnecessary iteration such possible combinations are not described here in the present invention.

Moreover different embodiments of the present invention can be combined freely as required as long as the combinations don't deviate from the ideal and spirit of the present invention. However such combinations shall also be deemed as falling into the scope disclosed in the present invention.

The invention claimed is:

1. An optical security device with full parallax diffraction optical variable image, comprising: a base layer; and an optical assembly at least partly covering one of surfaces of the base layer, and comprising a micro relief structure, so that the optical assembly presents a full parallax image in the effect of the micro relief structure when a beam of white light illuminates on the optical assembly wherein a phase of the micro relief structure is obtained through a phase plate according to the following steps:

1) decomposing an original image to be presented into a plurality of image frames corresponding to various observing directions;
2) obtaining a complex amplitude of an object plane according to amplitudes of the image frames and direction coefficients related to the image frames;
3) performing a fresnel reverse transformation on the complex amplitude of the object plane, and extracting a phase of the complex amplitude of object light at surface of the optical assembly obtained after the fresnel reverse transformation to obtain the phase of the micro relief structure;
4) obtaining a complex amplitude of the micro relief structure according to the phase of the micro relief structure;
5) multiplying the complex amplitude of the micro relief structure by a predesigned complex amplitude of the phase plate, and performing the fresnel transformation, decomposing the obtained result into the plurality of image frames corresponding to various observing directions, then taking amplitude of the complex amplitude of each image frame in the plurality of image frames as 1, and keeping the phase, and then multiplying the same by amplitude of frames of the original image to obtain a new complex amplitude of the object plane; and
6) performing the fresnel reverse transformation on the new complex amplitude of the object plane, and extracting the phase of the complex amplitude of object light at surface of the optical assembly obtained after the fresnel reverse transformation, to obtain the phase of the micro relief structure.

2. The optical security device according to claim 1, wherein the phase of the micro relief structure obtained through a final calculation is acquired by repeating steps 4)-6) for 5-10 times.

3. The optical security device according to claim 2, wherein a phase of the phase plate is obtained by the following steps:
dividing the phase plate into a plurality of pixels, size and number of the pixels are consistent with those of pixels of image frames of the original image;
re-dividing each of the pixels of the phase plate into sub-pixels having the same number of the plurality of image frames decomposed from the original image; and
endowing each of the sub-pixels with a phase value associated with a direction coefficient of the corresponding image frame, to obtain the phase of the phase plate.

4. The optical security device according to claim 3, wherein the phase value of the phase plate is obtained through multiplying absolute values of propagation vectors of the plurality of image frames by a first constant and then adding a second constant.

5. The optical security device according to claim 3, wherein phase distribution of the phase plate is a quadric surface added with a constant.

6. The optical security device according to claim 1, wherein the micro relief structure consists of a plurality of the micro relief units, and wherein a size of each of the micro relief units of the micro relief structure in at least one lateral direction is 0.3 μm-10 μm.

7. The optical security device according to claim 1, wherein the micro relief structure consists of a plurality of the micro relief units, and wherein a size of each of the micro relief units of the micro relief structure in at least one lateral direction is 0.8 μm-6 μm.

8. The optical security device according to claim 1, wherein a duty ratio of the micro relief structure is 0.2-0.8.

9. The optical security device according to claim 1, wherein a duty ratio of the micro relief structure is 0.35-0.65.

10. The optical security device according to claim 1, wherein a depth of the micro relief structure is 0.02 μm-3 μm.

11. The optical security according to claim 1, wherein a depth of the micro relief structure is 0.07 μm-1 μm.

12. The optical security device according to claim 1, further comprising: a duplicate layer, located between the base layer and the optical assembly, wherein a first surface of the duplicate layer is jointed with the base layer, and the micro relief structure of the optical assembly is formed at least a part of an area of a second surface of the duplicate layer.

13. The optical security device according to claim 12, further comprises:
  a coating layer, located on the optical assembly.

14. The optical security device according to claim 13, wherein the coating layer covers the optical assembly in same shape.

15. The optical security device according to claim 13, wherein the coating layer is patterned.

16. The optical security device according to claim 13, wherein the coating layer is one of a single layer of high refractive index dielectric, a single metal layer, or three-layer optical variable structure including a metal reflective layer, a dielectric layer and an absorption layer.

17. The optical security device according to claim 1, wherein a micro relief unit of the micro relief structure is one of sinusoid shape, zigzag shape, and rectangle, or is a combination of any two or three of the sinusoid shape, the zigzag shape, and the rectangle.

18. The optical security device according to claim 1, wherein a depth of the micro relief structure meets the following conditions: when a beam of white light is incident on the micro relief structure, light of a wavelength is constructively interfered in a direction of the transmission light and/or reflected light, so that the optical security device presents a first color in the direction of the transmission light and/or reflected light, and presents a second color in a diffraction light direction.

* * * * *